UNITED STATES PATENT OFFICE.

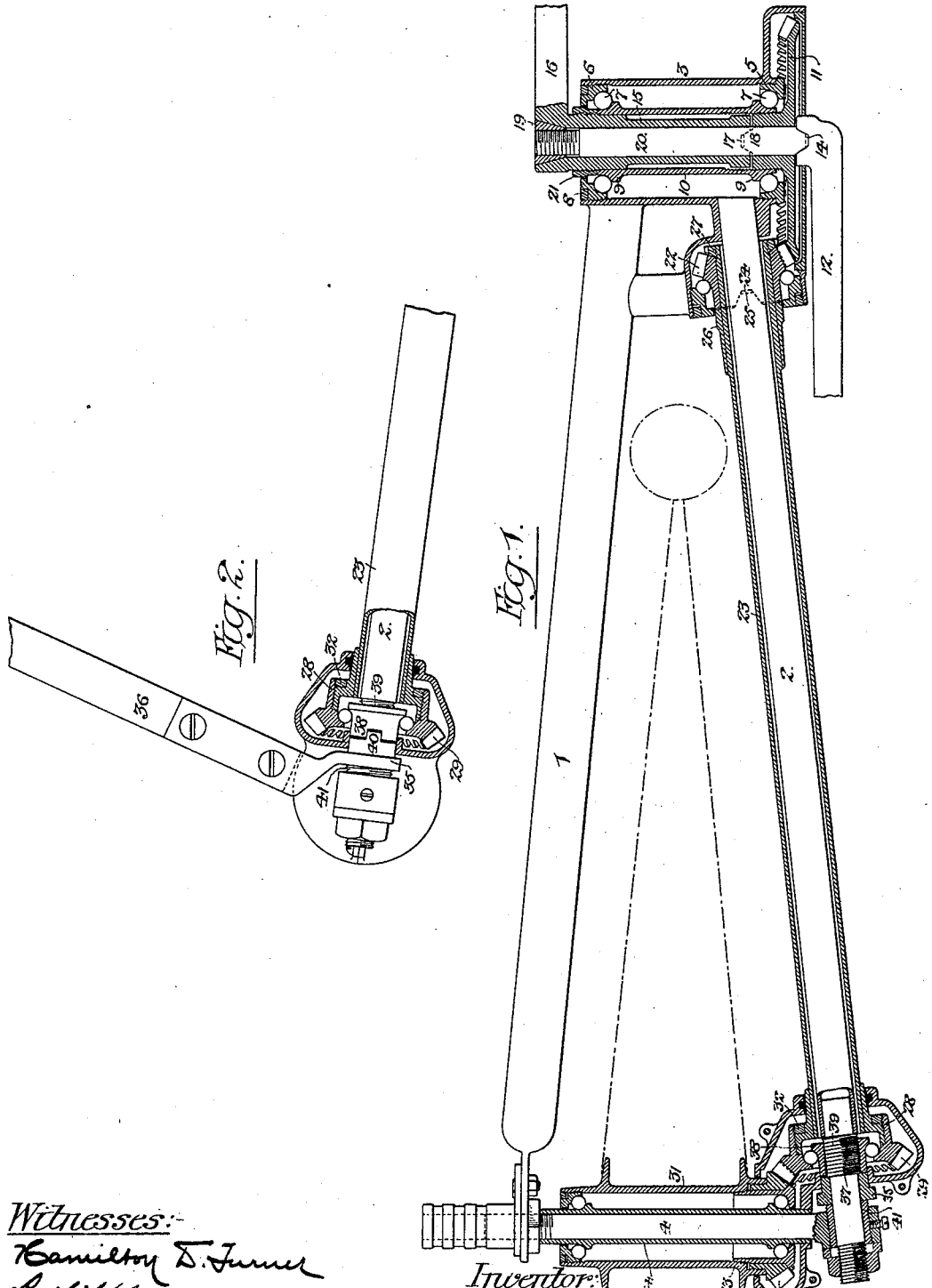

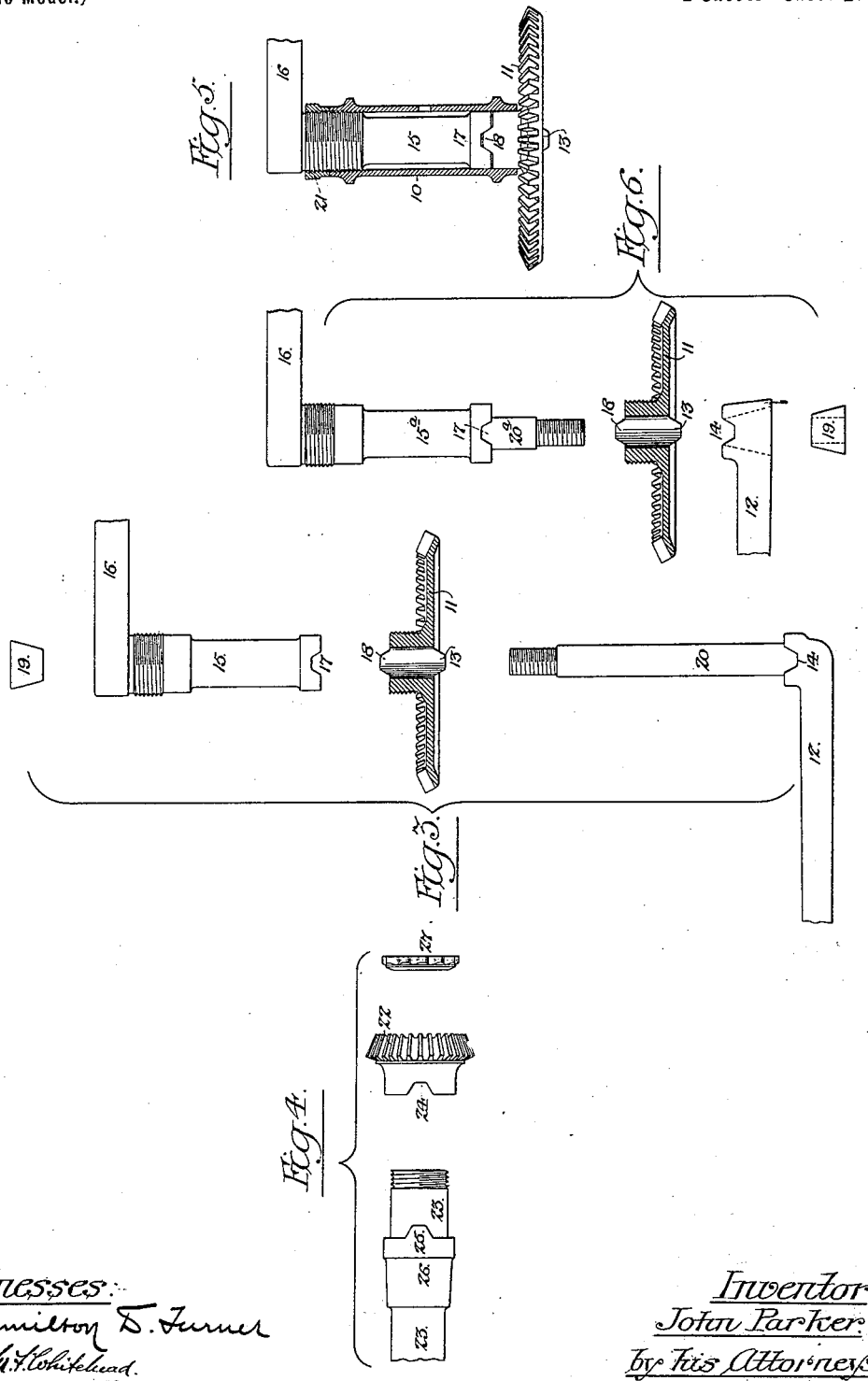

JOHN PARKER, OF PHILADELPHIA, PENNSYLVANIA, ASSIGNOR OF ONE-HALF TO PASCHAL HOLLINGSWORTH MORRIS, OF SAME PLACE.

DRIVING MECHANISM FOR CYCLES.

SPECIFICATION forming part of Letters Patent No. 666,548, dated January 22, 1901.

Application filed November 18, 1899. Serial No. 737,506. (No model.)

*To all whom it may concern:*

Be it known that I, JOHN PARKER, a citizen of the United States, residing in Philadelphia, Pennsylvania, have invented certain Improvements in Driving Mechanism for Cycles, of which the following is a specification.

My invention consists of certain improvements in the driving mechanism for bicycles, for which I have obtained Letters Patent No. 561,516, dated June 2, 1896, and No. 616,349, dated December 20, 1898, the objects of my present improvements being to provide for the ready assembling or removal of the cranks and crank-shaft without disturbing the bearings or crank-gear, to provide for the convenient adjustment of the driving-gears, and to maintain the rear and lower forks of the frame in fixed and definite relations to each other. These objects I attain in the manner hereinafter set forth, reference being had to the accompanying drawings, in which—

Figure 1 is a view, partly in outside view and partly in sectional plan, of sufficient of a bicycle to illustrate my present invention. Fig. 2 is a view of the rear portion of the same, partly in side elevation and partly in section. Fig. 3 is a view illustrating the parts of the crank-shaft and crank-gear separated from each other. Fig. 4 is a detached view of parts of the gearing. Fig. 5 is a sectional view illustrating a special construction of the crank shaft and gear, and Fig. 6 is a sectional view of another form of crank shaft and gear embodying the invention.

In Fig. 1 the lower forks of the frame are represented at 1 and 2, these forks being rigidly secured at their forward ends to the tubular crank-hanger 3 and carrying at their rear ends the rear axle 4, as in my former patents before alluded to. The crank-hanger 3 has at its opposite ends outer races 5 and 6 for the balls 7, constituting the bearings for the crank-shaft sleeve 10, the race 6 being adjustable and being held in position after adjustment by a lock-nut 8 or in any other suitable manner. The inner races 9 for the balls 7 are formed upon the sleeve 10, into one end of which is fitted the hub of the gear-wheel 11, which constitutes the primary element of the driving-gear and is locked to one of the cranks 12 by means of projections 13, which enter corresponding recesses 14 in the hub of said crank. The opposite end of the sleeve 10 receives the tubular shaft 15 of the other crank 16, which shaft has at its inner end recesses 17 for the reception of projections 18 upon the inner end of the hub of the gear-wheel 11, the projections of said gear-wheel being pressed firmly into the recesses 14 and 17 of the crank hub and shaft by the action of a nut 19, which is adapted to the end of the opening in the hub of the crank 16 and screws upon the threaded end of the shaft 20 of the crank 12, which passes through the hub of the gear-wheel 11 and also through the hollow shaft 15 of the crank 16. A nut 21 is applied to a threaded portion of the hollow crank-shaft 15, adjacent to the crank 16, and bears upon the end of the sleeve 10, so as to lock the shaft 15 thereto and insure the rotation of the sleeve 10 with said shaft.

In the construction shown in Fig. 1 the hub of the gear-wheel 11 is threaded for adaptation to the internally-threaded end of the sleeve 10, while the shaft 15 of the crank 16 fits snugly into the opposite end of said sleeve; but in some cases it may be advisable to reverse this construction, as shown in Fig. 5—that is to say, to provide a simple sliding fit of the hub of the gear-wheel 11 in the end of the sleeve 10 and to screw the shaft 15 into the opposite end of said sleeve, as this construction renders it unnecessary to thread the hub of the gear-wheel 11, which must be subsequently hardened. If desired, the crank-shaft may be solid, as shown at 15$^a$ in Fig. 6, and may have a projecting threaded portion 20$^a$, which passes through the hub of the gear-wheel 11 and through an opening in the hub of the crank 12, the latter receiving the nut 19. With either construction, however, both cranks are firmly locked in engagement with the gear-wheel 11, and yet the ready introduction and removal of the cranks and their shaft and also of the gear-wheel are permitted without disturbing the sleeve 10 or its bearings, and any desired adjustment of the gear-wheel 11 in the direction of the axis of the crank-shaft can be effected in order to insure the proper mesh of said gear-wheel with the pinion 22 upon the tubular power-transmitting shaft 23, which surrounds the lower fork 2 of the frame as before. This pinion 22 is adapted to a bearing in a tubular rearwardly-extending projection of the hanger 3 and is secured to the tubular shaft 23 by somewhat the same means as those adopted for securing the gear-wheel 11 to the crank-shaft, recesses 24 in the hub of the wheel receiving projections 25 on a collar 26, which is secured by brazing or other available means to the tubular shaft 23, a nut 27 applied to the threaded end of said shaft serving to force the pinion 22 rearwardly on the shaft, and thus insure the rigid clutching of the same to the collar 26.

The rear end of the shaft 23 has an expanded collar 28, threaded externally, and onto this collar is screwed the internally-threaded hub of the gear-wheel 29, which drives the pinion 30 on the hub 31 of the rear wheel of the bicycle, a reverse-thread lock-nut 32 screwing into the internally-threaded hub of the gear-wheel 29 and bearing against the collar 28, so as to rigidly confine the wheel 29 thereto. The pinion 30 has an externally-threaded hub which is screwed into the internally-threaded end of the hub 31 of the rear wheel of the bicycle and is locked thereto by means of the ball-race 33, which has at the outer end a flange bearing upon the outer face of the pinion 30 and at the inner end a threaded portion engaging with the internally-threaded hub 31. The hub 31 of the rear wheel is mounted upon bearings on a sleeve 34, surrounding the rear axle 4, so that said rear wheel and sleeve can be moved transversely on the axle for gear adjustment, as in the previous patented structures.

The rear end of the lower fork 2 of the frame is attached to the lower end 35 of one of the rear braces 36 of the frame, as in former constructions, said part 35 being either integral with or secured to said brace, as desired; but said portion 35 of the rear brace now has its bearing against a shoulder 37 on the fork 2 instead of upon the inner ball-race 38 of the bearing for the gear-wheel 29, so that said ball-race 38 can be adjusted upon the threaded portion 39 of the fork 2 to provide for adjustment of gears or bearings without affecting the alinement of the frame, projections 40 on the brace 35 engaging with recesses in the ball-race 38 to lock it in position after adjustment.

Fore-and-aft adjustment of the rear axle 4, so as to provide for proper meshing of the teeth of the gear-wheel 29 and pinion 30, is effected, as before, by means of a nut 41, screwed into the internally-threaded projecting end of the axle 4 and bearing upon the lower end 35 of the brace 36.

It will be observed that the gear-wheels on the side transmitting-shaft are detachable, so as to provide for the hardening of the same when they are thus detached, it being difficult to harden such a wheel or pinion after it has been attached to the shaft by brazing without impairing its connection with the shaft.

Having thus described my invention, I claim and desire to secure by Letters Patent—

1. The combination in driving mechanism for cycles, of a crank-hanger, a two-part laterally-separable crank structure, a gear-wheel having locking elements upon its outer and inner sides, means independent of the gear-wheel for confining the two parts of the crank structure together and in engagement with the locking elements of the gear-wheel, a sleeve separate from the said wheel and in respect to which the wheel is longitudinally adjustable without loosening its locking connection with the crank structure, and bearings for said sleeve in the crank-hanger, substantially as specified.

2. The combination in driving mechanism for cycles, of a crank-hanger, a two-part laterally-separable crank structure, a gear-wheel having locking elements upon its inner and outer sides, means independent of the gear-wheel for confining the two portions of the crank structure in engagement with said locking elements, and a bearing-sleeve screwed at one end upon a threaded portion of the shaft of one of the cranks but free from connection with the crank structure at the other end and having at said other end a sliding fit upon the hub of the gear-wheel, whereby longitudinal adjustment of the gear-wheel in respect to the sleeve is permitted without loosening the locking connection between said gear-wheel and the crank structure, substantially as specified.

3. The combination in driving mechanism for cycles, of the crank-shaft having a driving gear-wheel thereon, the rear hub having a pinion thereon, the tubular power-transmitting shaft surrounding one of the lower forks of the frame and having at the front end a pinion engaging with the gear-wheel on the crank-shaft and at the rear end a gear-wheel engaging with the pinion on the rear hub, and a rear brace having a depending portion which carries the rear end of the lower fork projecting beyond the power-transmitting shaft, is in locking engagement with the adjustable ball-race for the bearing of the rear gear-wheel, and bears against a shoulder on said lower fork, substantially as specified.

In testimony whereof I have signed my name to this specification in the presence of two subscribing witnesses.

JOHN PARKER.

Witnesses:
  WILL. A. BARR,
  JOS. H. KLEIN.